United States Patent [19]

Varadi et al.

[11] 3,798,617

[45] Mar. 19, 1974

[54] PERMANENT STORAGE MEMORY AND MEANS FOR ADDRESSING

[75] Inventors: Andrew G. Varadi, Briarwood; Richard B. Rubinstein, New York, both of N.Y.; Steven Radoff, Nashua, N.H.

[73] Assignee: General Instrument Corporation, Newark, N.J.

[22] Filed: May 8, 1972

[21] Appl. No.: 251,527

Related U.S. Application Data

[62] Division of Ser. No. 86,882, Nov. 4, 1970, Pat. No. 3,691,534.

[52] U.S. Cl. .......................... 340/173 R, 307/221 C

[51] Int. Cl. .................................................. G11c 7/00

[58] Field of Search ...... 340/173 R, 174 A, 174 TB; 307/238, 221 R, 221 C

[56] References Cited

UNITED STATES PATENTS

| | | | |
|---|---|---|---|
| 3,665,422 | 5/1972 | McCoy | 340/173 R |
| 3,518,627 | 6/1970 | Meyer | 340/173 R |
| 3,680,061 | 7/1972 | Arbab | 340/173 R |
| 3,644,904 | 2/1972 | Baker | 340/173 R |

OTHER PUBLICATIONS

Hoff, Silicon-Gate Dynamic Mos Crams 1,024 Bits on a Chip, Electronics, August 3, 1970, pp. 68–73.

*Primary Examiner*—Bernard Konick
*Assistant Examiner*—Stuart Hecker

[57] ABSTRACT

A permanent storage memory comprises a data storing section in which data is stored in a predetermined manner at a plurality of address stations defined by intersecting rows and columns. A plurality of data nodes are operatively associated respectively with the columns of the memory and means are provided for addressing a selected row thereby to develop a plurality of data signals at said data nodes corresponding respectively to the stored bits at the addressed row. A second addressing means is effective to provide a unique signal corresponding to the selected column and is effective to initiate the transfer of data signals to an output terminal from a predetermined one of the data nodes.

6 Claims, 5 Drawing Figures

PERMANENT STORAGE MEMORY AND MEANS FOR ADDRESSING

This is a division of application Ser. No. 86,882 filed Nov. 4, 1970, entitled "Read Only Memory Having Increased Rate of Data Readout", now U.S. Pat. No. 3,691,534.

The present invention relates to memory systems, and particularly to a permanent storage memory system having an increased rate of data readout.

A memory system is an integral part of a digital processing computer. Its basic function in the computer is to store data in a manner which permits that data to be readily interrogated or "read" and transferred either from the memory to succeeding logic or arithmetic stages in the computer or to the computer readout section. One basic type of memory is the permanent storage or "read-only" memory in which data is stored in permanent form in a predetermined arrangement. For this type of memory data can only be read; that is, no provision is made for inserting or writing new data into an address in that memory. A memory of this general type is described in a co-pending patent application Ser. No. 791,759, filed on Jan. 16, 1969 in the name of Richard B. Rubinstein and Andrew G. Varadi, entitled "Read Only Memory With Operative And Inoperative Data Devices Located At Address Stations And With Means For Controllably Charging And Discharging Appropriate Nodes Of The Address Stations," now U.S. Pat. No. 3,611,437, and assigned to the assignee of the present application.

One of the prime design criteria for memories of this type is the rate at which data can be read while still providing a non-ambiguous data output. Other criteria for memory performance include ease and economy of fabrication, the volume that the memory takes up in the computer system — the smaller the required volume, the more efficient is that memory — and the amount of power dissipated during the use of that memory.

Heretofore, the rate at which data could be read out from a memory has been limited by the maximum system clock rate, that is, the frequency of the clock signals which control the logic operations of the computer. Practical design considerations have limited the maximum clock rate for use in a computer system to a value in the area of 5mhz. Moreover, the operation of the system at an increased clock rate increases the power dissipation of the system and usually requires an increase in the volume of the memory. With the increased switching speeds made available by the use of newly developed switching devices such as field effect transistors (FETs), which are rapidly gaining industry acceptance in the design of computer and logic circuitry, correspondingly high speeds of data readout can now be contemplated and are in fact desired to improve the speed and efficiency of computer operation.

To increase the rate of performance of logic systems such as memory systems in view of the limitations heretofore set by the maximum available clock rates, the idea of multiplexing the outputs of two or more of such systems under the control of multi-phase clock signals has been considered and has been incorporated into certain shift register systems to enable those systems to operate at higher data rates. In the multiplexing operation, a logic operation is performed on one unit during one phase of a clock period and in another unit during another phase of that clock period. This has the result of doubling the effective rate of logic operation, since two separate logic functions are performed during a single clock period. To produce a data output signal at that increased data rate, means must be provided to reconstitute the outputs of the component units in that system in correspondence to the same clock signals that were utilized in the initial sampling operation. Until now these means have required the use of relatively complex and sophisticated circuits which included buffering and amplifying stages, to provide the required isolation between the two component units and sufficient drive to the output stages which receive the recombined data signal. Such circuits increase the size, cost, and power dissipation of the memory system and thus detract from some of the benefits which would otherwise be obtained from the multiplexing operation.

In a commonly employed type of memory a portion of the memory may be addressed in a random manner and data from that selected portion is then scanned and transferred to an output location. This type of memory may be used in a computer system in which an initially selected address determines which of a multiplicity of multi-bit words is to be read out from that memory. Thus, a single address function to the memory is effective to produce a word having a predetermined number of bits, that word being produced by sequentially scanning and transferring information bits from a different location in the addressed portion of the memory during each clock period. For example, in a computer programmed for preparing standard invoices, order letters and the like, the initial addressing operation instructs the memory to prepare a specified type of invoice. The computer then automatically sequentially reads the stored information at the selected portion of the memory and produces from the information stored in the selected portion of the memory a form corresponding to the particular invoice selected by the initial addressing of the memory.

As the desired output information may comprise a number of different multi-bit words, a number of memory sections in a given memory unit may be simultaneously scanned so that during each readout operation (i.e., during each clock period) one bit from each memory section in that unit is provided at the unit output. The number of bits in the output word is equal to the number of memory sections in the memory and the number of such multi-bit words is equal to the number of sequential scanning operations performed on the unit.

In a data sequencing operation of this type, the maximum rate at which data may be sequentially read out from the memory is again limited by the maximum system clock rate.

In the operation of memories in which data is sequentially read out from an addressed portion of the memory, it is often desirable to be able to select the location at that addressed portion of the memory from which the scanning operation is to begin. For example, in an arithmetic operation it may be desired to transfer a stored number beginning with a certain digit in that number corresponding to the location of the decimal point, so that the scanning sequence would begin at a specified digit in that stored number. Heretofore, the selection of the point at which the scanning was begun, was effected by supplying information in parallel word form to a shift register or the like to preset the register. This, however, required the use of additional logic circuitry to produce the parallel word and to process and transmit that word to the shift register in a manner effective to preset the register for the purposes described.

It is, therefore, an object of the present invention to provide a memory system from which data can be read out at increased rates.

It is a further object of the present invention to provide a memory system in which the rate of data readout is not limited by the maximum available clock rate.

It is yet a further object of the present invention to provide a permanent storage memory which operates at increased rates of data readout without the requirement of an increase in the size, cost and/or power dissipation of the memory.

It is another object of the present invention to provide a memory system in which data is sequentially transferred to an output in which the point at which the sequential data transferring operation is begun is preset in a novel and effective manner which reduces the complexity of the data scanning circuitry.

It is a further object of the present invention to provide a memory system in which the outputs of two different memory units are produced at different phases of a clock period and combined at an output of the system to provide for an effective increase in the rate at which the output data is produced, which does not require complicated combining circuitry.

To these ends, the present invention provides a permanent storage memory system in which information in the form of logic bits is permanently stored in different predetermined patterns at first and second memory units. These units receive first and second timed signals and are alternately processed by these signals to transfer a selected information bit to the output of one unit during one of these timed signals, and to transfer a data bit to the output of the other memory unit during the second of these timed signals. At corresponding times during a given clock period, when data is not being transferred to the respective outputs of the memory units, means are provided to block the transmission of data to the output of each of the units by selectively placing that memory unit output to a reference condition. In this manner, the outputs of the two units can be readily combined or multiplexed at a common output point without the provision of isolating or buffering circuitry between the memory unit outputs. For this purpose, a switching device controlled by the presence or absence of one of the timed signals is provided between the output node of each unit and a reference point, and is selectively actuated during the non-data-transferring part of a clock period to establish the unit output at its reference, data-blocking condition at the desired portion of a clock period.

Each memory unit may comprise a plurality of individual memory sections each having an output terminal. Means are provided to simultaneously address each section in a memory unit and to transfer data from one of the output terminals of each memory section to the unit output nodes which are in turn operatively connected to corresponding output nodes of the other memory unit at the common memory output.

The data output terminals of each memory section in each memory unit are sequentially scanned at different phases of each succeeding clock period. In this manner a number of multi-bit words (one bit being derived from each memory section) are sequentially read out from a selected portion of each memory, one such word being read out from each memory unit during each clock period. Thus by performing a single addressing operation (e.g., row select) a single multi-bit word (when no scanning is performed) or a plurality of such words (when scanning is performed) are read out of the memory at a rate twice that of the system clock rate.

The memory location from which the data is initially transferred from the selected memory sections to the unit output node may be preset by means of a novel shift register-decoder circuit. That circuit comprises a shift register having a plurality of stages and a corresponding plurality of logic decoder circuits. The latter are conditioned by an input address signal to initially, (i.e., prior to a scanning operation) uniquely preset one circuit point at a unique level. That uniquely charged point is operatively associated with the memory section output terminal from which the data scanning or transferring sequence is to be initiated.

To the accomplishment of the above, and to such objects as may hereinafter appear, the present invention relates to a permanent storage memory system as defined in the appended claims and as described in this specification, taken together with the accompanying drawings, in which:

Figure 1:
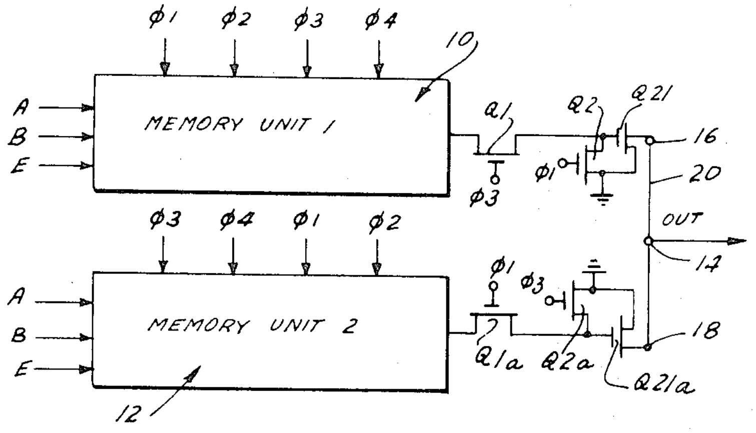
FIG. 1 is a schematic block diagram of the memory system of the present invention showing the input signal applied to each memory unit, and the output circuitry combining the outputs from each unit at a common memory output.
Figure 4:
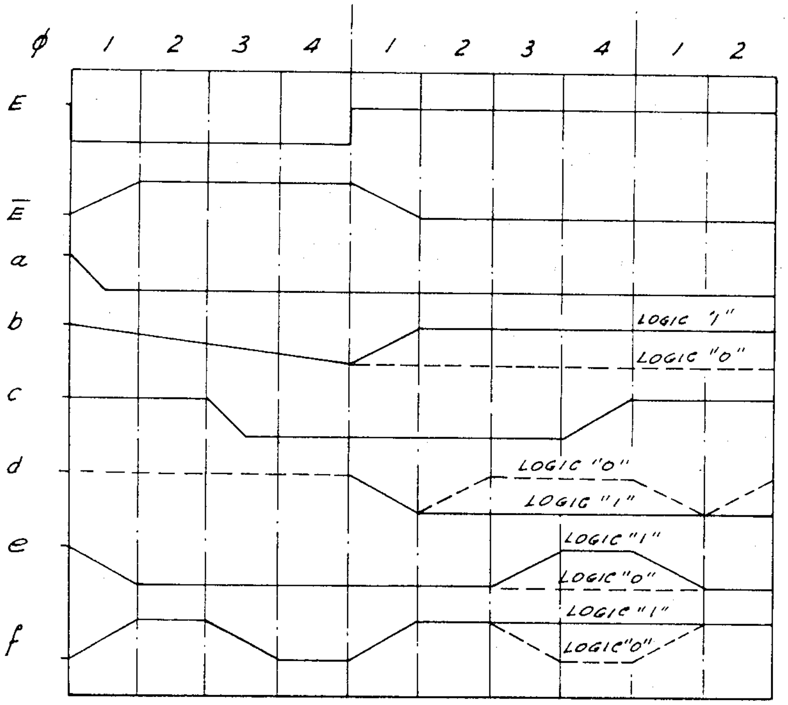
Figure 2:
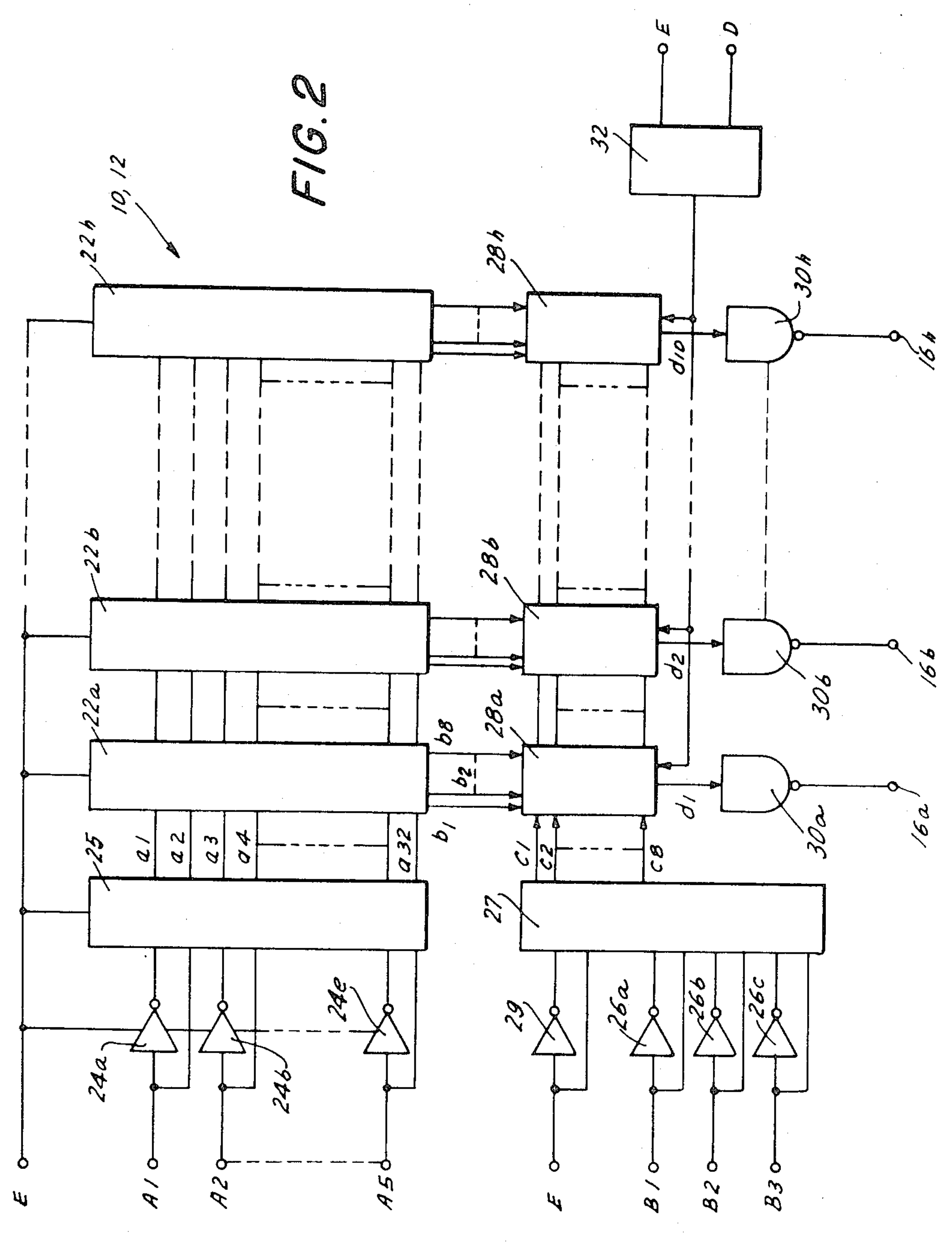
FIG. 2 is a more detailed block diagram of one of the memory units of the system of FIG. 1.
Figure 3A:
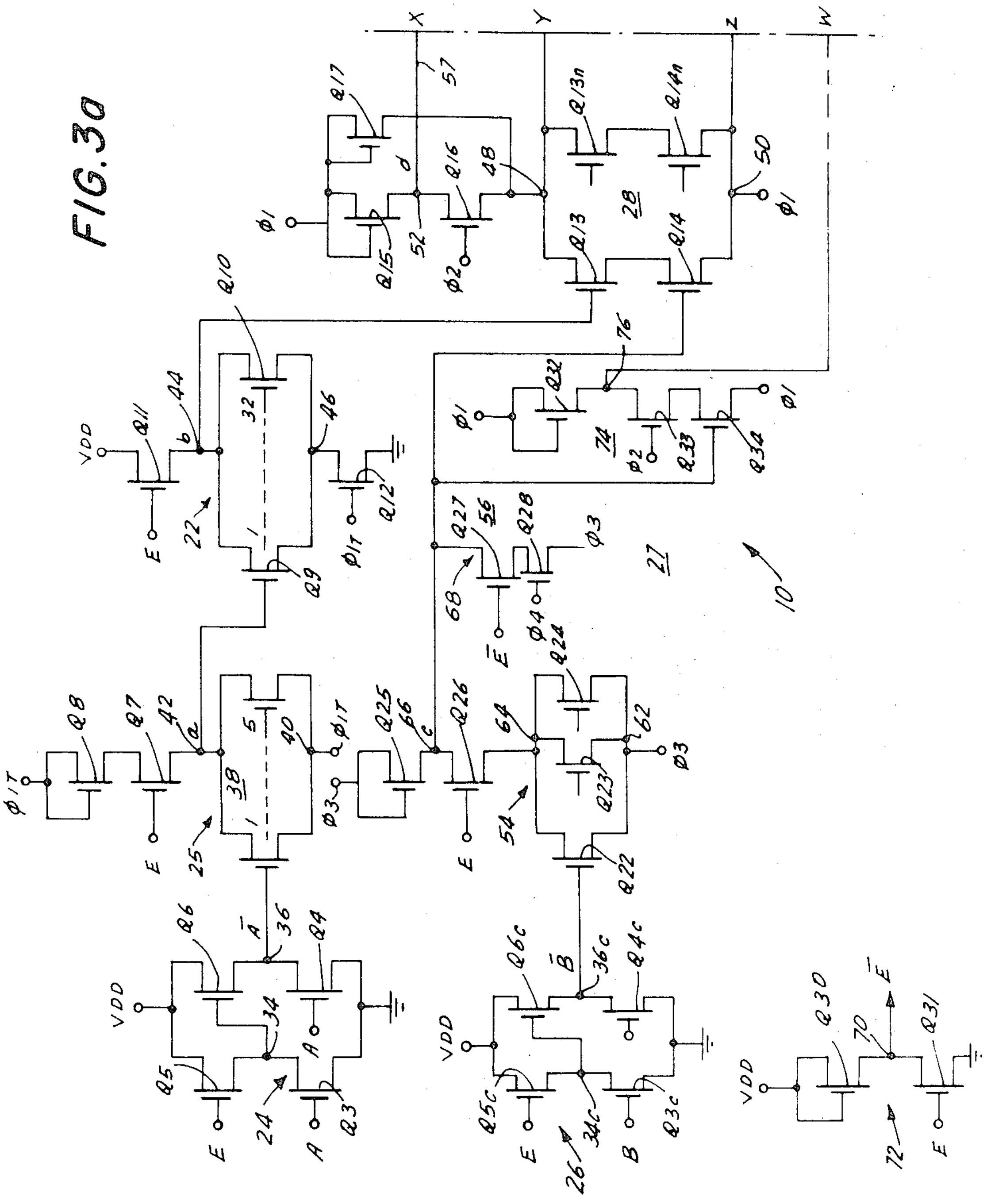
Figure 3B:
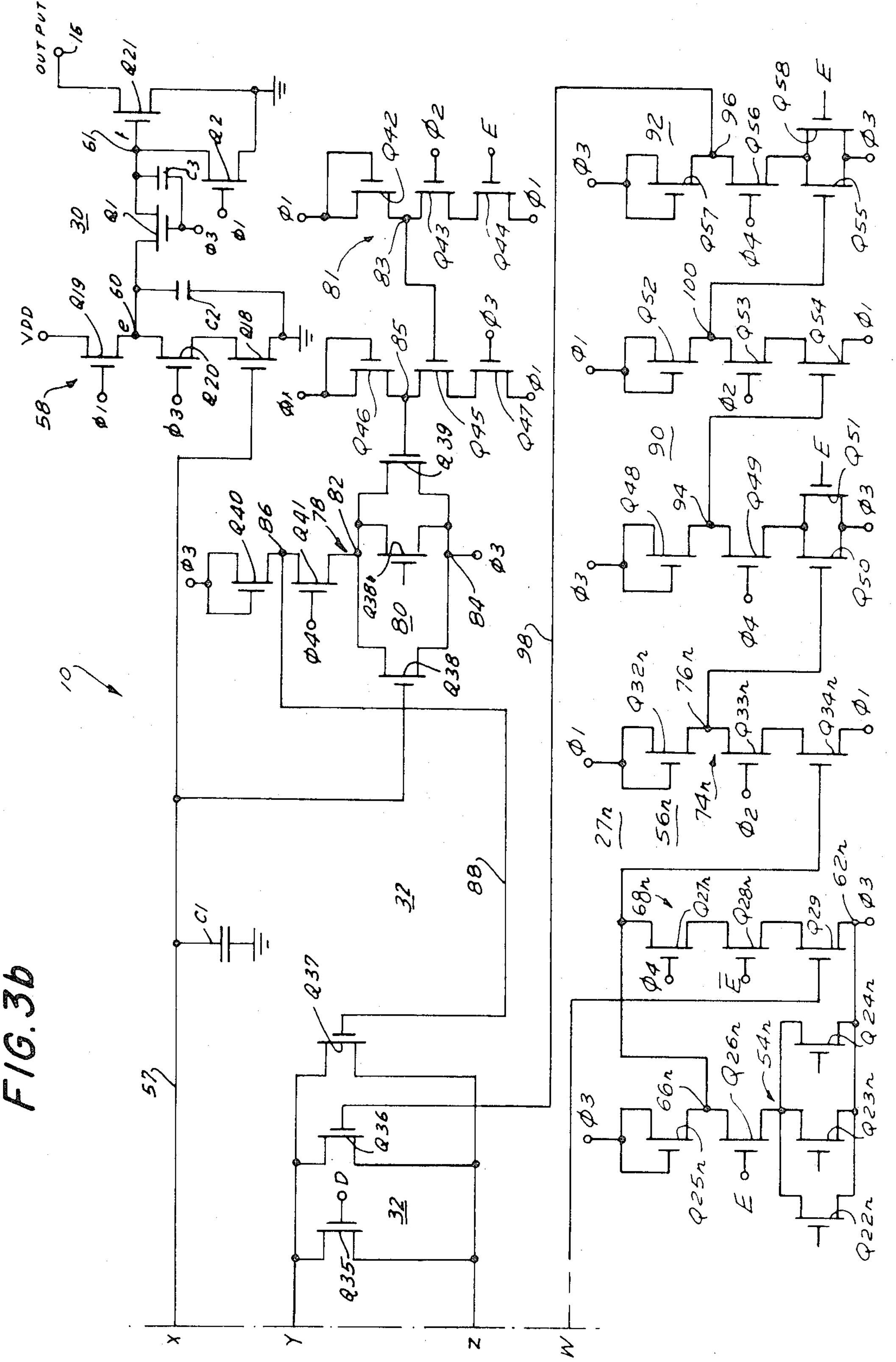

FIGS. 3*a* and 3*b*, are sections of a complete schematic circuit diagram of the memory unit of FIG. 2; and FIG. 4 is a waveform diagram of the enabling, addressing, and data signals of the memory system of the present invention.

GENERAL DESCRIPTION

Broadly described, the memory system of the present invention comprises first and second memory units generally designated 10 and 12 operatively connected to one another at a common memory output 14. Each memory unit comprises one or more memory sections or matrixes in which data is stored in different predetermined arrangements. These memory sections may be read-only memories of the general type disclosed in said co-pending patent application in which the particular logic bit stored at a given address is defined by the presence or absence of a potentially active switching device located at that address, although it is to be understood that other memories may be utilized in the memory system of this invention with equally satisfactory results.

Each memory unit 10, 12 receives input four-phase clock signals $\phi 1$, $\phi 2$, $\phi 3$, $\phi 4$ which are each present during a unique portion of a given clock period. These signals are applied to the units 10 and 12 in predetermined reverse order for purposes described below. Addressing signals generally designated A and B, and an enabling signal E are also applied to each memory unit. As shown in FIG. 4, the enabling signal E is present (i.e., negative) throughout only one clock period during an operation on the memory and absent (i.e., positive) thereafter.

Each unit 10, 12 comprises addressing circuitry which translates the input addressing signals A, B into address select signals. The latter signals are processed to produce data output signals corresponding to the stored information bit at the selected address in each of the memory units.

The output data signal of unit 10 is operatively conneted to a unit output node 16 through a pair of signal transferring devices in the form of field effect transistors (FETs) Q1 and Q21. FET Q1 comprises an output circuit between its source and drain terminals and a control terminal or gate to which the $\phi3$ clock phase signal is applied. When clock phase signal $\phi3$ is present (i.e., negative), the output circuit of FET Q1 is conductive and when it is absent (i.e., positive) its output circuit is non-conductive. A data blocking device in the form of FET Q2 has its output circuit connected between the gate of FET Q21 and a reference point here shown as ground. The gate of FET Q2 receives the $\phi1$ clock phase signal and is conductive to connect node 16 to ground when the $\phi1$ clock phase is present (i.e., negative).

In a similar manner, the selected data signal from memory unit 12 is operatively connected to its output node 18 through the output circuit of FETs Q1*a* and Q21*a*. The output circuit of a second data blocking device, FET Q2*a*, is connected between the gate of FET Q21*a* and ground. Significantly, the gate of FET Q1*a*, receives the $\phi1$ clock phase signal and that of FET Q2*a* receives the $\phi3$ clock phase signal. Nodes 16 and 18 are connected to one another by means of a single connection 20 which defines the common output 14 at any point thereon.

Since FETs Q1 and Q2a are conductive during $\phi3$ time (i.e., when the $\phi3$ clock phase signal if present), during that $\phi3$ time the data signal from unit 10 is transferred through the conducting output circuit of FET Q1 to the gate of FET Q21 and the gate of FET Q21*a* is connected to ground through the conducting output circuit of FET Q2*a*. Moreover, since FETs Q1*a* and Q2 are non-conducting at this time, data transfer through FET Q1*a* is prevented and the gate of FET Q21 is isolated from ground. During $\phi1$ time the situation is reversed in that the data signal from unit 12 is then transferred through the output circuit of FET Q1*a* to the gate of FET Q21*a*, and the gate of FET Q21 is connected to ground through the conducting output circuit of FET Q2. As a result, during $\phi1$ time FET Q21 is unconditionally (irrespective of the unit 10 data signal) an open circuit, and at $\phi3$ time, FET Q21*a* is similarly an unconditional open circuit, thereby defining a reference condition of the output nodes 16 and 18 during the data blocking clock period of their respective memory units. The data signals (ground for a logic "0" and open circuit-high impedance for a logic "1" data signal) are produced at output nodes 16 and 18 during $\phi3$ and $\phi1$ times respectively in a manner to be more completely described in a later part of this specification.

Thus the data signals from units 10 and 12 are effectively multiplexed at output 14, that is, data is transferred to output 14 from a first unit during one part of a clock period and blocked from a second unit during that part, and transferred from the second unit and blocked from the first unit during a second part of that clock period. A data signal thus appears at output 14 twice during each clock period at a rate which is effectively twice that of the clock rate. The isolation between units 10 and 12 provided by the output data blocking transistors Q2 and Q2*a* in units 10 and 12 respectively, permits the combination of the data outputs of units 10 and 12 by means of only the simple single-wire connection 20.

FIG. 2 schematically illustrates one of memory units 10 and 12, that diagram being applicable to both these units. As here particularly described each memory unit 10, 12 comprises eight read-only memory sections 22*a*–22*h* (only sections 22*a*, *b* and *h* being shown in block diagram form in FIG. 2). Each memory section contains, in the embodiment herein specifically described, 32 rows intersecting with eight columns, thereby to define 256 address locations at the row-column intersections in each memory section. A single logic bit is stored at each of these address locations at one of two discrete logic levels corresponding to the logic "1" or logic "0" condition. For reasons to be described in a later portion of this specification, each memory section may also comprise an additional column in which all logic "0" signals may be stored.

Each memory section is simultaneously addressed by means of a row select decoder 24 which receives the five row input signals A1–A5 and their complements produced by inverters 25*a*–25*e* respectively, and logically processes these signals to produce a unique (negative) row select signal for the selected row. In this manner an output data signal is produced at each of the 64 columns in each of units 10,12, those data signals corresponding to the absence or presence of a switching device at the address locations defined at the intersections of these columns and the selected row.

The three column input signals B1, B2 and B3 and their respective complements produced in inverters 26*a*–26*c* respectively, are applied to a combination shift register and column decoder 27. During the enabling period, i.e., when the E signal is present, decoder 27 produces a unique column select signal which is applied along with the selected data signals to the inputs of a plurality of NAND gates 28*a*–28*h* receiving the eight data outputs from memory sections 22*a*–22*h* respectively. The eight outputs of these gates represent the stored data at the intersections of the selected row and selected column in each of the eight memory sections 22*a*–22*h*. These data outputs are applied to the inputs of inverter output stages 30*a*–30*h* each of which includes FETs Q1,Q2 and Q21 in unit 10 and FETs Q1*a*,Q2*a* and Q21*a* in unit 12. The outputs of stages 30*a*–30*h* produced at output nodes 16*a*–16*h* respectively define an eight-bit output word which is transferred to output node 16 from unit 10 during $\phi3$ time, and to output node 18 of unit 12 during $\phi$ time.

After the termination of the enabling period (i.e., after one clock period) the column decoder part of register-decoder 27 is disabled and the shift register part thereof is enabled and shifts the column select signal to an adjacent (e.g., lower) column each clock period. In this manner, the output data signals at each memory section 22*a*–22*h* are scanned during successive clock periods following the end of the enabling period. That data scanning operation begins at that column in each memory section initially selected by the column decoder and continues until the memory is disabled by the operation of a disabling circuit 32. Each memory unit 10, 12 comprises eight outputs, thereby to provide an eight-bit output word at output 14. A new eight-bit output word is transferred to the output twice each clock period, one such word from unit 10 and another such word from unit 12.

The output of disabling circuit 32 is operatively connected to gates 28*a*–28*h*. Under certain conditions, including the presence of an input disabling signal D at its input, circuit 32 produces an output disabling signal which when present is effective to block data signals from the unit outputs.

DETAILED CIRCUIT DESCRIPTION

FIGS. 3*a* and 3*b* are collectively a partial schematic circuit diagram of memory unit 10. The circuit of memory unit 12 is substantially identical to that of FIGS. 3*a* and 3*b* with the difference that the input clock phase signals to the column decoder and shift register 27, gate 28, inverter stage 30, and circuit 32, are reversed in the two units. That is, for unit 12 the counterparts of the various FETs in unit 10 that receive the $\phi 3$ clock phase signal receive instead the $\phi 1$ clock phase signal and vice versa. Similarly the $\phi 2$ and $\phi 4$ clock phase signal inputs to the two units 10, 12 are reversed. Memory sections 22 and row decoder 25 in both units 10 and 12 receive the same clock phase signals at corresponding circuit points, these common clock phase signals being identified in FIG. 3*a* by the subscript "T."

For the purpose of simplifying the circuit diagram of FIGS. 3*a* and 3*b*, circuitry associated with only one of the eight columns of one of the eight memory sections 22, one of the five row input inverters 24, and one of the 32 row decoders 25 are shown. Moreover, only one of the three column input inverters 26, one of the eight register-decoders 27, and one of the eight NAND gates 28 are shown. It is to be understood that the remaining corresponding circuits of memory unit 10 are identical in their arrangement and manner of operation with those shown in FIGS. 3*a* and 3*b*.

The row inverter 24 (see FIG. 3*a*) comprises FETs Q3 and Q4 each of which receives one of the five row input signals A at its gate. The output circuit of FET Q3 is connected between ground and a point 34 defined at its junction with the output circuit of FET Q5 which receives the enabling signal E at its gate. The output circuit of FET Q4 is connected between ground and a point 36 defined at the junction with the output circuit of FET Q6, the gate of which is connected to point 34. FETs Q5 and Q6 have their output circuits connected to the $V_{DD}$ negative voltage supply.

During the enabling period, the E signal is negative and renders FET Q5 conductive to precharge point 34 to a negative level, which in turn renders FET Q6 conductive so as to precharge point 36 negative. If the row signal A is positive both FETs Q3 and Q4 remain in their off condition and point 36 remains negative. On the other hand, if the row signal A is negative FETs Q3 and Q4 are both rendered conductive and points 34 and 36 are both connected to ground. As a result FET Q6 is turned off and point 36 is discharged toward ground potential. The level at point 36 is thus the inverse $\bar{A}$ of the input row signal A as desired.

That $\bar{A}$ signal, along with either the true or complement of the other four row input signals, is applied to one of the gates of the five FETs in NOR gate 38 in row decoder 25. The output circuits of these FETs are connected in parallel between a point 40 to which clock phase $\phi 1T$ is applied, and a point 42. During $\phi 1$ time (when the enabling signal is present), point 42 is precharged negative through the then conducting output circuits of FETs Q7 and Q8. If at times other than $\phi 1$ time all inputs to gate 38 are positive, all possible conducting paths between points 40 and 42 are cut off and point 42 remains at its negative level, thereby to define a uniquely negative row select signal *a*. As shown in FIG. 4, the uniquely negative row select signal *a* is stable by $\phi 2$ time during the enabling period and remains stable thereafter. At least one of the inputs to the thirty-one other row NOR gates is negative to provide a conducting path between their points 42 and ground. As a result all other row select signals, corresponding to the unselected 31 rows, are at ground potential at the termination of the enabling period.

The uniquely negative row select signal is applied to the gates of all the devices, if present, in the selected row of memory section 22, only one such device in one column of that memory section being shown in FIG. 3*a*.

The selected address location defined by the selected row and the illustrated column is shown in FIG. 3*a* as having a potentially active switching device (FET Q9) thereat, thereby to define one stored logic condition, e.g., logic "1", at that address location. For storage at the other logic condition, e.g., logic "0," there would be no such device at that row-column intersection. (FET Q10 represents the potentially active switching device located at the intersection of the thirty-second row and the illustrated column.)

The output circuit of FET Q9 is connected between point 44 and point 46. During $\phi 3$ time in the enabling period, point 44 is precharged negative through the conducting output circuit of FET Q11 which is conductive during the enabling period. The output circuit of FET Q12 is connected between point 46 and ground and its gate receives the $\phi 1_T$ clock phase signal.

For the assumed condition of an active device at the selected row-column intersection point 44 is discharged to ground during the $\phi 1$ time following the termination of the enabling period through the series connected output circuits of FETs Q9 and Q12. If, on the other hand, there is no active device at that row (i.e., the row select signal would be ineffective to actuate FET Q9) point 44 would remain at its precharged negative level.

Thus the logic signal *b* produced at point 44 (shown in FIG. 4 for both the logic "1" and logic "0" conditions at the selected address location) corresponds to the stored logic level at the selected address location as defined by the absence or presence of a potentially active FET at that address location. That logic signal is stable by $\phi 2$ time after the termination of the enabling period (FET Q11 is non-conductive when the enabling signal is not present) for both memory units 10 and 12 and corresponding signals of either logic level will be produced at that time at all eight columns in all eight memory sections in memory units 10 and 12, those signals corresponding to the stored data at the intersections of these columns and the selected row.

The logic signal *b* at point 44 is applied to one input of NAND gate 28 at the gate of FET Q13 the output circuit of which is connected to the output of FET Q14. The gate of the latter receives the column select signal *c* corresponding to one of the eight columns in memory section 22, that signal being negative only for the selected column. There are eight such series connected pairs of FETs Q13 and Q14 in each gate 28, a second such pair being represented by FETs Q13*n* and Q14*n*. The eight series pairs of FETs in gate 28 are connected in parallel between points 48 and 50. FETs Q15 and Q16 are connected between the $\phi 1$ clock phase and point 48 and define a point 52 at the junction of their output circuits. In addition, FET Q17 is connected in parallel with the series pair of FETs Q15 and Q16 and receives the $\phi 1$ clock phase signal at its gate. Fet Q15 also has the $\phi 1$ clock phase signal applied to its gate and FET Q16 receives the $\phi 2$ clock phase signal at its gate. Point 50 is connected to the $\phi 1$ clock phase signal source. During $\phi 1$ time, points 48 and 52 are precharged negative through the output circuits of FETs Q17 and Q15 respectively. FET Q14 in the series pair of FETs in NAND gate 28 which receives the uniquely negative column select signal is rendered conductive. If the logic signal *b* is negative (logic "0") FET Q13 is also conductive and points 48 and 52 are discharged to ground during $\phi 2$ time through the conducting output circuits of FETs Q16, Q13 and Q14 (the $\phi 1$ clock phase signal at point 50 is at ground potential at this time). On the other hand, if the logic signal *b* is at ground potential (logic "1") FET Q13 remains nonconductive and points 52 and 48 remain at their precharged negative levels. The data signal *d* derived at point 52 is thus the inverse of the logic signal produced at the selected column of memory section 22. There will be eight such signals at each of the NAND gates 28 and each memory unit 10, 12, one signal being derived from each of the eight memory sections 22 in each memory unit.

The data signal *d* at point 52 is operatively connected by a line 57 (extending into FIG. 3b) to the input of an inverter stage 58 forming a part of output stage 30. A capacitor C1 is connected between line 57 and ground and is precharged negative during $\phi 1$ time along with point 52 through the output circuit of FET Q15. The charge on that capacitor provides the actual input signal to the gate of FET Q18 in stage 58. If the data signal *d* is at ground during times other than $\phi 1$ time (logic "0") capacitor C1 is discharged to ground while for a negative data signal *d* (logic "1"), capacitor C1 remains at its precharged negative level. The provision of capacitor C1 intermediate memory section 22 and output stage 30 aids in the isolation of these circuits from one another and facilitates the multiplexing of the output signals from units 10 and 12.

Inverter stage 58 comprises FETs Q18, Q19 and Q20, all of which have their output circuits connected in series between the $V_{DD}$ source and ground. The gate of FET Q19 receives the $\phi 1$ clock phase signal and the gate of FET Q20 receives the $\phi 3$ clock phase signal. A point 60 is defined at the junction of the output circuits of FETs Q19 and Q20. Point 60 is precharged negative during $\phi 1$ time through the output circuit of FET Q19. For a negative data signal FET Q18 is turned on and point 50 is discharged to ground through the output circuits of FETs Q20 and Q18 during $\phi 3$ time. On the other hand, if the data signal is at ground FET Q18 is non-conductive and point 60 remains at its precharged negative level. As a result, an intermediate data signal *e* is produced at point 60 that signal, as shown in FIG. 4, being the inverse of the data signal during $\phi 3$ and $\phi 4$ times following the enabling period.

Point 60 is connected to one terminal of the output circuit of data-transferring FET Q1, the other terminal of which is connected to the gate of an output FET Q21. One terminal of the output circuit of FET Q21 is connected to the unit output node 16 and the other terminal is connected to ground. The output circuit of data-blocking FET Q2 is also connected between the gate of FET Q21 (at an intermediate point 61) and ground.

As described above, FET Q1 is conductive only during the data-transfer portion of each clock period (e.g., $\phi 3$ for unit 10) and connects point 60 to point 61 during this interval. During the data-blocking portion of a clock period (e.g., $\phi 1$ time for unit 10) point 61 is disconnected from point 60 and is connected to ground through the output circuit of FET Q2. A drive data signal *f* (last line of FIG. 4) produced at point 61 is thus at ground during $\phi 1$ time and corresponds to the intermediate data signal e during $\phi 3$ time.

For a logic "1" condition at the selected address location at memory section 22, the input signal to the gate of FET Q21 during $\phi 3$ time is at ground potential and node 16 acts as a high impedance; for a logic "0" condition, a negative signal is applied to the gate of FET Q21 and output node 16 is at ground since it is connected through the output circuit of FET Q21 to ground. During $\phi 1$ time, for either logic condition at the selected memory location, the gate (point 61) of FET Q21 is connected to ground and a high impedance point is thus unconditionally defined at output node 16.

A capacitor C2 may be connected between point 60 and ground to provide an additional net capacitance at point 60 with respect to ground. It has been found that this additional capacitance serves to ensure adequate drive from inverter stage 58 to the output circuit of data-transferring FET Q1. Furthermore, a capacitor C3 may be connected between the gates of FETs Q1 and Q21 to provide additional negative drive to the gate of FET Q21 during $\phi 3$ time to ensure that the latter is conductive for a logic "0" condition at point 61.

For memory unit 10 (shown in FIGS. 3a and 3b) the data output signal is stable by the $\phi 4$ time following the termination of the enabling period. For the memory unit 12 in which data is transferred to the output node during $\phi 1$ time and blocked therefrom during $\phi 3$ time, the data output signal is stable by the second $\phi 2$ time following the termination of the enabling period.

COLUMN SELECT AND DATA SCANNING

The column select signal is initially derived in a NOR gate 54 (See FIG. 3*a*) of register-decoder 27 during the enabling period in accord with input column select signals B1–B3. After the termination of the enabling period, NOR gate 54 is disabled, and the column select signal is then shifted once each clock period from its initial preset point by the operation of the shift register portion 56 of register-decoder 27 which is enabled at that time.

The complement of each column input signal is produced in an inverter 26 which is similar in design and manner of operation to row inverter 24. Components of inverter 26 corresponding to those in inverter 24 are identified by corresponding reference symbols having the suffix "*c*" added thereto. Inverter 26 produces at point 36c the complement $\bar{B}$ of the column input signal B, that signal being applied to the gate of FET Q22, one of the FETs in column NOR gate 54. The other two FETs Q23 and Q24 in that gate respectively receive either the true or complement of one of the other two column input signals. The output circuits of FETs Q22–Q24 are connected in parallel between points 62 and 64. FETs Q25 and Q26 are connected between $\phi 3$ clock phase source and point 64, and define a point 66 at the junction of their output circuits. The gate of FET Q25 receives the $\phi 3$ clock phase signal and the gate of FET Q26 receives the enabling signal E.

Point 66 is precharged negative through the output circuit of FET Q25 during $\phi 3$ time. If all the inputs of FETs Q22 – Q24 in NOR gate 54 are positive (i.e., for the selected column) during the enabling period, there is a conducting path between points 62 and 64, and point 66 thus remains negative. The column select signal c is produced at that point.

Also connected to point 66 is one stage 68 of shift register 56, which comprises FET Q25 along with FETs Q27 and Q28. The output circuits of FETs Q27 and Q28 are connected in series between point 66 and the $\phi 3$ clock phase signal. The complement $\bar{E}$ of the enabling signal E (produced at point 70 in an inverter 72 comprising FETs Q30 and Q31 having their output circuits connected in series between $V_{DD}$ supply and ground) is applied to the gate of FET Q27 and the gate of FET Q28 receives the $\phi 4$ clock phase signal.

A shift register propagating stage 74 comprising FETs Q32 and Q33 and Q34 having their output circuits connected in series between the $\phi 1$ clock phase signal source defines along with register stage 68 one bit of shift register 56. The gate of FET Q32 receives the $\phi 1$ clock phase signal, the gate of FET Q33 receives the $\phi 2$ clock phase signal and the gate of FET Q34 is connected to point 66. A point 76, defined at the junction of the output circuits of FETs Q32 and Q33, is connected to the succeeding register stage (not shown) in shift register 56. What has been so far described is the column 1 select circuitry for memory unit 10. For each memory unit there are eight such circuits, one circuit for each of the eight data-carrying columns in memory sections 22. This is represented by the broken line extending between point 76 on FIG. 3*a* and the column 8 register-decoder 27*n* on FIG. 3b. Register-decoder 27*n* comprises a NOR gate 54*n* and a shift register 56*n* having stages 68*n* and 74*n*. The circuitry of the eight column register-decoders is essentially the same and all components in register-decoder 27*n* corresponding to those in register-decoder 27 are identified by corresponding reference characters which have the subscript *n* added thereto. A FET Q29, not provided in shift-register 27, is provided in the other, i.e., columns 2–8, register-decoders and, as shown in register-decoder 27*n*, it is connected between one output terminal of FET Q28*n* and the $\phi 3$ clock phase signal at point 62*n*. The gate of FET Q29 is connected to the point 76 of the immediately preceding shift register (not shown) of the column 7 register-decoder (also not shown).

In the description to follow it is assumed that column 1 of the memory sections is to be initially addressed. During the enabling period when FET Q26 is conductive, FET Q27 controlled by the $\bar{E}$ signal is non-conductive. As a result, the column decoder NOR gate 54 is enabled (i.e., connected to point 66). At the termination of the enabling period this situation is reversed, and as shown in FIG. 4 the $\bar{E}$ signal becomes negative and the enabling E signals at ground potential.

At this time, FET Q27 is rendered conductive and shift register 56 is enabled, i.e., connected to point 66, and the column decoder NOR gate 54 is disabled after having established, during the enabling period, a preset condition at point 66 corresponding to which of the eight columns in each memory section 22 is initially selected by the logic condition of the column input signals.

As a result, in the first clock period following the completion of the enabling period data is simultaneously read from all memory sections 22 from the address locations defined by the intersection of the selected row and the selected column. In the succeeding clock periods, the column selection is taken over by the shift register 45 which proceeds to shift the uniquely negative column select signal *c* at point 66 one column upward with respect to the initially selected column. In other words, following the enabling period the column select signal *c* at point 66 is determined by the operation of the bits of shift register 56. During $\phi 2$ time ($\phi 4$ time for unit 12) of each clock period following the completion of the enabling period, the shift register shifts one bit upward. As a result the point 66 of the initially selected column is charged to ground and the point 66 associated with the immediately succeeding column is charged negative to provide for data readout from that latter column.

The gate of FET Q34 receives the precharged negative signal from point 66 (for the initially selected column) and causes point 76 to be charged to ground during $\phi 2$ time through the output circuit of FET Q33. At this time the gate of FET Q28 is receiving a negative signal from the propagating stage of the next higher register bit. As a result during $\phi 4$ time following the termination of the enabling period at which time FET Q28 is turned on, point 66 is connected to point 62 (at ground potential during times other than $\phi 3$ time) to cause point 66 to charge to ground. In this manner the initially selected column is shifted to a non-selecting, i.e., ground condition.

At the same time the FET Q29 of the immediately succeeding column register-decoder receives a ground signal from point 76 of stage 74 so that its column select point 66, which is precharged negative during $\phi 3$ time, remains at that negative level for the second clock period following the completion of the enabling period to define the column select signal for that period. In this manner the uniquely negative column select signal *c* is shifted upward (beginning at the column initially selected during the enabling period by NOR gate 54) during each clock period following the termination of the enabling period. Data is thus sequentially read out from a different column of the memory sections 22 each subsequent clock period.

DISABLING

Disabling circuit 32 (See FIG. 3*b*) is effective upon the occurring of any one of three conduits to disable the output data signal. These three conditions are, (1) the presence of an external disabling signal D; (2) the presence of a logic "0" readout at all eight memory sections 22 in a unit; and (3) the completion of a scanning operation. It does this in memory unit 10 by operatively connecting point 52 to ground at all times other than $\phi 1$ time (at which time data transfer is blocked from the unit 10 by the operation of data blocking FET Q2), and in memory unit 12 by grounding point 52 at all times other than $\phi3$ time. It is also desired to prevent an output signal from either of th memory units during the memory set up or enabling period.

To this end, FETs Q35, Q36 and Q37 are connected in parallel across NAND gate 28, that is, between points 48 and 50. When any one of these FETs is conductive, that is, when a negative signal is applied to the gate of any of these transistors, point 48 is connected to point 50 (which is at ground at times other than $\phi1$ time ) through the output circuit of the conductive disabling FET. As a result, point 52 is charged to ground during $\phi2$ time and remains at the level until the subsequent $\phi1$ time independent of the logic condition at the addressed memory location as represented by the input signal at gate of FET Q13.

The externally generated disabling signal D is applied to the gate of FET Q35. When that signal is present FET Q35 is conductive and the memory unit 10 is disabled, that is, its output node 16 is unconditionally tied to ground.

The gate of FET Q37 receives a signal from a "count-zero" circuit 78 which receives the data signal *d* from each of the eight memory sections 22 in the memory unit. Circuit 78 comprises a nine-input NOR gate 80 which comprises nine FETs connected in parallel Eight of these FETs respectively receive the data signal *d* from the eight memory sections (e.g., FETs Q38 and Q38n) and the ninth FET Q39 receives the output signal from the latch control circuit 81 at its gate. It will be remembered that it is desired that significant output data be obtained from unit 10 by the $\phi4$ time after the enabling period, and from unit 12 only the second $\phi2$ time after the enabling period. However, memory section addressing or look-up is completed in unit 10 by $\phi4$ time during the enabling period, and in unit 12 by $\phi2$ time during the enabling period (point 66 in unit 12 is precharged negative during $\phi1$ time rather than during $\phi3$ time as shown in FIG. 3a for unit 10).

Thus means must be provided with regard to unit 12 to prevent an erroneous data signal from appearing at the output node 18 of unit 12 until the proper time, to wit, the second $\phi2$ time after the termination of the enabling period.

Latching circuit 81 on unit 10 ensures that count-zero circuit 78, which has been rendered operative upon the presence of an all-zero output word on unit 10 during or at the end of a previous memory operation, remains latched, that is, it prevents meaningful data from appearing at unit output node 16, during the set up or enabling period.

A similar latching circuit is provided on unit 12 (in which the clock phase signals are reversed) which is effective to maintain the circuit 78 on that unit latched one-half period after the end of the enabling period to prevent output data from appearing at output node 18 during this time. On unit 12, the first column in each of its memory sections 22 is addressed during the time that output is blocked from the output node 18 so that the data stroed in those first columns is not significant and may be conveniently set at an all-zero condition as noted above.

Latching circuit 81 comprises a first series gating circuit comprising FETs Q42, Q43 and Q44 having their output circuits connected in series between the $\phi1$ clock phase signals ($\phi3$ on unit 12). A point 83 is defined at the junction of the output circuits of FETs Q42 and Q43 and is precharged negative during $\phi1$ time. The $\phi2$ clock phase signal is applied to the gate of FET Q43 and the enabling signal is applied to the gate of FET Q44. Point 83 is connected to the gate of FET Q45 whose output circuit is connected in series with the output circuits of FETs Q46 and Q47 between the $\phi1$ clock phase signals ($\phi3$ on unit 12). A point 85, connected to the gate of FET Q39 in count-zero circuit 78, is defined between the output circuits of FETs Q45 and Q46. A NOR gate 80 of count-zero circuit 78 is connected between points 82 and 84. Point 82 is connected to the $\phi3$ clock phase signal through the series connected output circuit of FETs Q40 and Q41 defining a junction point 86 therebetween. The $\phi3$ clock phase signal is applied to the gate of FET Q40 and to point 84, and the $\phi4$ clock phase signal is applied to the gate of FET Q41. Point 86 is connected by a lead 88 to the gate of FET Q37.

Point 86 is precharged negative during $\phi3$ time through the output circuit of FET Q40. If all the inputs of FETs Q38–Q38*n* and Q39 in gate 80 are at ground — corresponding to the logic "0" from all memory sections 22 in the unit and a "0" or ground signal at point 85 — there is no conduction path between points 82 and 84, and point 86 remains negative. FET Q37 is thus rendered conductive and unit 10 is disabled as described above. If any of the imputs to gate 80 were negative point 86 would be discharged to ground during $\phi4$ time (during which time point 84 is at ground) through the output circuit of FET Q41 and the path in NOR gate 80 rendered conductive by that negative input.

During the enabling period in unit 10, an all-zero input to circuit 78 is ensured since point 44 is unconditionally charged negative in both units 10 and 12 through FET Q11. The logic signal *b* at that point only becomes meaningful at $\phi2$ time following the end of the enabling period when the enabling signal E is terminated and FET Q12 is turned on during the immediately preceding $\phi1$ time. As a result, until that $\phi2$ time, control over the latching signal at point 86 is achieved solely by the signal at the gate of FET Q39, that is, the signal produced at point 85 of latching circuit 81, in combination with the operation of FET Q41.

In unit 12 latching circuit 81 has the effect of sampling the enabling signal E and delaying it by one-half of a bit or cycle so that circuit 78 remains unconditionally latched — the signal at point 86 remains negative and data is blocked from unit 12 such as by providing an all-zero output at unit output node 18 until the $\phi2$ time following the termination of the enabling period. At that time, the signals at the gates of FETs Q41 and Q44 are both negative and point 86 discharges to ground at point 84 (the $\phi1$ clock phase is at ground at this time). As a result, erroneous output data, that is, data obtained from the initially addressed column in the unit 12 memory sections 22 at the $\phi2$ time during the enabling period, is effectively suppressed.

In unit 10, latching circuit 81 has no meaningful effect on the operation of circuit 78 as its operation passes the enabling signal to the gate of FET Q39 without delay and point 86 is discharged to ground by the end of the enabling period. Thus circuit 81 could be omitted from unit 10 and the enabling signal applied directly to the gate of FET Q39. However, for the sake of uniformity of unit chip design and fabrication, circuit 81 is also preferably included in unit 10 as shown in FIG. 3*b*.

As described above, data is initially simultaneously read out from a selected column of each memory section 22, that column being selected by the $\phi 2$ time of the enabling period by the operation of column NOR gate 54. Following the initial column selection, the stages of the shift register 56 are shifted one column each clock period, thereby to sequentially scan the information bits stored at the selected row of each memory section. After the data signals of the highest numbered data containing columns, that is, column 8 in unit 10 and column 9 in unit 12, are read out from the memory, it is desired to disable the outputs of the memory units output.

To this end an addition shift register 90 and an additional shift register stage 92 are provided. Shift register 90 has no associated column NOR gate, and has a point 94 which, when charged negative after columns 8 are addressed, becomes effective to address column 9 in the memory sections 22. In unit 10, column 9 contains all logic zeros, so that when it is addressed, an all-zero count is sensed at count zero circuit 78, which in turn is effective to ground point 52 and thus to disable the output of unit 10. In unit 12 column 9 contains significant data, so that, one-half bit after column 9 is addressed in unit 12, point 96 in stage 92, which is connected by a line 98 to the gate of FET Q36, is charged negative and grounds point 52, thereby to disable the output of unit 12 as desired.

Shift register 90 in unit 10 comprises a first stage which includes FETs Q48, Q49, Q50, having their output circuits connected in series between the $\phi 3$ clock phase signals, point 94 being defined between the output circuits of FETs Q48 and Q49. FET Q51, which receives the enabling signal E at its gate, has an output circuit connected in parallel with that of FET Q50 to insure that point 94 is at ground during $\phi 4$ time during the enabling period. The $\phi 4$ clock phase signal is applied to the gate of FET Q49 and the $\phi 3$ clock phase signal is applied to the gate of FET Q48.

The second stage of shift register 90 comprises FETs Q52, Q53 and Q54 having their output circuits connected in series between the $\phi 1$ clock phase signals, a point 100 being defined at the junction of the FET Q52 and FET Q53 output circuits. The $\phi 1$ clock phase signal is applied to the gate of FET Q52, the $\phi 2$ clock phase signal is applied to the gate of FET Q53, and the gate of FET Q54 is connected to point 94.

Point 100 is connected to the gate of FET Q55 in register stage 92, the output circuit of which is connected in series with the output circuits of FETs Q56 and Q57 between the $\phi 3$ clock phase signals. Point 96 is defined at the junction of the FET Q56 and FET Q57 output circuits. FET Q58 has its output circuit connected in parallel with that of FET Q55 and has the enabling signal E applied to its gate to insure that point 96 is unconditionally at ground during $\phi 4$ time during the enabling period.

In operation, the column scanning sequence on both units begins with the initially selected column and proceeds to count each cycle by the operation of the shift registers 56–**56*n*. In unit 12, column 1 contains no useful data, and in any event, data from the initially selected column is blocked from the unit's output during the enabling period and one-half cycle thereafter. Thus, if data from column 5, for example, is to be initially read out from unit 12, column 4 should be initially addressed in unit 12. (This, of course does not apply to the initial column select in memory unit 10**.)

When the scanning operation has reached column 8 in unit 10, the data read out from that unit is completed, and point **66*n* is charged negative. That negative signal is propagated by the second stage of shift register 56*n* and the first stage of shift register 90 to point 94 which becomes negative one cycle thereafter to address column 9 in the memory sections. As set forth above, this column in the unit 10 memory sections contains all zeros, so that when it is addressed, it will actuate count-zero circuit 78, cause point 86 to go negative, FET Q37 to be conductive, point 52 to be grounded, and the unit 10 output to be disabled, all as described above. During the following cycle, the negative signal at point 94 is propagated to point 100 in shift register stage 92, which renders FET Q37 conductive. This operation in unit 10** is superfluous as the data output is already disabled by the actuation of FET Q36 one-half cycle earlier.

However, in unit 12, column 9 in the memory sections contains meaningful data, and when column 9 is addressed in that unit, count-zero circuit 78 is not actuated and the data from columns 9 is passed to the unit 12 output. However, one-half cycle after the addressing of columns 9, point 96 becomes negative, and FET Q37 is rendered conductive, point 52 is grounded, and the memory unit 12 output is disabled at that time, as desired. Shift register state 92 could thus be omittted from unit 10 as it serves no purpose, but is included on unit 10 to make for uniformity in chip design and fabrication for both units.

MEMORY OPERATION

In operation of the memory system of this invention, row select and initial column select are effected during the enabling period. Following the completion of the enabling period information bits are read out from the selected row-column intersections of each memory section 22 in each of units 10, 12 during $\phi 3$ and $\phi 1$ times respectively. Data read out from these units is blocked from their unit output nodes during $\phi 1$ and $\phi 3$ times respectively.

During the succeeding clock periods details sequentially read-out from each memory unit from address locations defined by the intersections of the selected row, and progressively higher numbered columns. Information read-out continues until the occurrence of one of the conditions that produce disabling.

The output of the memory system at terminal 14 comprises an eight-bit word produced two times during each clock period — one word being derived from unit 10, the other from unit 12. The number of such eight-bit words is determined by the number of columns sequentially scanned during the readout operation — up to a maximum of 16 such eight-bit words. As a result of the multiplexing of the outputs of units 10 and 12, memory readout is performed at a rate which is effectively twice that of the system clock. Increased speed of memory readout is thus achieved without significantly increasing the power consumption, volume, or complexity of the system. Moreover, the rate of data readout is no longer limited by the maximum available system clock rate but may be provided at rates up to twice that maximum rate. The outputs of the component memory units are readily combined at the memory output terminal without the need of complex and power consuming output circuitry.

Data is scanned from a different location in each unit in the memory, that scanning being performed sequentially under the control of a novel shift register and column decoder circuit. That circuit is effective to initially preset the memory to establish the location from which the scanning procedure is initiated and then to change the column selected signal each succeeding clock period.

While only a single embodiment of the present invention has been herein specifically disclosed, it will be apparent that many variations can be made thereto without departing from the spirit and scope of the invention.

We claim:

1. A permanent storage memory comprising a data storing section in which a plurality of information bits are stored in a predetermined manner at a plurality of address stations defined by intersecting lines of first and second types, said data storing section having a plurality of data nodes respectively operatively associated with said lines of said first type, first addressing means effective to address a selected line of said second type of said data storing section and to develop a plurality of data signals at said data nodes corresponding respectively to the stored bits at said addressed line, an output terminal, and means effective to successively and periodically transfer a data signal from each of said data nodes to said output terminal, said transferring means comprising second addressing means effective to produce a unique signal corresponding to a selected line of said first type and effective to initiate the transfer of said data signals to said output terminal from a predetermined one of said data nodes.

2. The memory of claim 1, in which said data storing section comprises a supplemental line of one of said first and second types having data stored therein in a unique pattern, and comprising means operatively connected between said supplemental line and said transferring means and effective when said supplemental line is addressed to disable said transferring means.

3. The memory of claim 2, in which data is stored at said address stations in one of two discrete logic conditions, all of said address stations in said supplemental line being of one of said logic conditions, and comprising logic means operatively connected to said supplemental line and switching means operatively connected to said logic means and effective when actuated to unconditionally place said output node in a reference condition, said logic means being effective when said supplemental line is addressed to actuate said switching means.

4. In the memory of claim 1, in which said signal transferring means comprises gating means, means operatively connecting said data nodes to said gating means, and means effective to produce timed scanning signals and to operatively connect said scanning signals to said gating means, said gating means being effective to operatively transfer said data signals to said output terminal upon the operative time coincidence of a data signal and a scanning signal.

5. The memory of claim 4, in which said scanning signal producing means comprises a shift register having a plurality of interconnected stages corresponding in number to the number of said data nodes, a corresponding plurality of output nodes respectively operatively associated with said data nodes at which said scanning signals are derived, and means controlled by an enabling signal and effective to initially operatively connect said second addressing means to said output nodes and to charge one of said output nodes corresponding to the selected one of said lines of said first type to a first signal level and the other of said output nodes to a second signal level and to disconnect said shift register stages from said output nodes, thereby to initiate the transfer of said data signals from the data node operatively associated with said one of said output nodes.

6. The memory of claim 5 in which said addressing means associated with said supplemental line comprises a plurality of logic gates each having a logic node and each receiving a different group of input address signals, said signals being effective to render one of said gates uniquely non-conductive, said connecting means comprising switch means actuated by said enabling signal and effective when so actuated to operatively respectively connect said logic node to said output nodes, means to precharge said output nodes to a first level during a first period, and means to discharge all but one of said output nodes through said logic gates other than said non-conductive one to a second level during a second period and to maintain that one of said output nodes operatively connected to said non-conductive gate at said first level.

* * * * *